(12) United States Patent
Giraudet et al.

(10) Patent No.: US 8,061,838 B2
(45) Date of Patent: Nov. 22, 2011

(54) PROGRESSIVE LENS FOR OPHTHALMIC SPECTACLES, HAVING AN ADDITIONAL ZONE FOR INTERMEDIATE VISION

(75) Inventors: Guillaume Giraudet, Charenton le Pont (FR); Isabelle Poulain, Charenton le Pont (FR)

(73) Assignee: Essilor International (compagnie Generale d'optique), Charenton le Pont (FR)

( * ) Notice: Subject to any disclaimer, the term of this patent is extended or adjusted under 35 U.S.C. 154(b) by 14 days.

(21) Appl. No.: 12/746,190

(22) PCT Filed: Dec. 3, 2008

(86) PCT No.: PCT/FR2008/052195
§ 371 (c)(1),
(2), (4) Date: Jun. 4, 2010

(87) PCT Pub. No.: WO2009/077708
PCT Pub. Date: Jun. 25, 2009

(65) Prior Publication Data
US 2010/0283963 A1 Nov. 11, 2010

(30) Foreign Application Priority Data
Dec. 5, 2007 (FR) ...................................... 07 08499

(51) Int. Cl.
*G02C 7/06* (2006.01)
(52) U.S. Cl. .................................................... 351/169
(58) Field of Classification Search ........... 351/168–171
See application file for complete search history.

(56) References Cited

U.S. PATENT DOCUMENTS

| 6,886,938 | B1 | 5/2005 | Menezes |
| 7,413,303 | B2 * | 8/2008 | Guilloux et al. ............... 351/169 |
| 7,673,990 | B2 | 3/2010 | Esser et al. |
| 2010/0321633 | A1 * | 12/2010 | De Rossi et al. ............... 351/169 |

FOREIGN PATENT DOCUMENTS

| EP | 0872755 | 10/1998 |
| WO | 97/26579 | 7/1997 |
| WO | 2004/104674 | 12/2004 |
| WO | 2005/026825 | 3/2005 |
| WO | 2005/040893 | 5/2005 |

OTHER PUBLICATIONS

Jalie M "Progressive lenses Part 2, the new generation" *Optometry Today, Association of Optometrists..* Jun. 17, 2005, pp. 35-45. (XP002406290).
Jessica L. Hogan, et al. "Good PALs Come in Small Frames" May 2000, 6 pages. (XP002533569).
Stefanie Schuldt "ysis—natürliches sehen erleben" Deutsche Optiker Zeitung. May 1, 2004. pp. 38-43. (XP002398937).

* cited by examiner

Primary Examiner — Darryl J Collins
(74) Attorney, Agent, or Firm — Occhiuti Rohlicek & Tsao LLP

(57) ABSTRACT

A progressive lens for ophthalmic spectacles has an additional zone for intermediate vision. This additional zone is located beneath a near-vision zone. It enables objects located at a distance of between 1.0 and 1.5 meters, in a direction inclined at about 35 degrees to a line of sight passing through a cross mark (CM) on the lens, to be seen clearly. To achieve this, the optical power progression between a far-vision point (FV) and a near-vision point (NV) of said lens has a power-increase threshold which is located approximately at the cross mark.

17 Claims, 3 Drawing Sheets

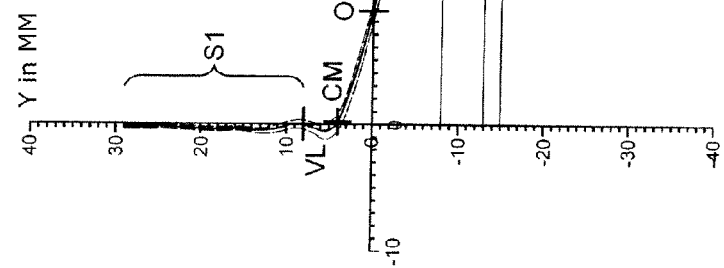
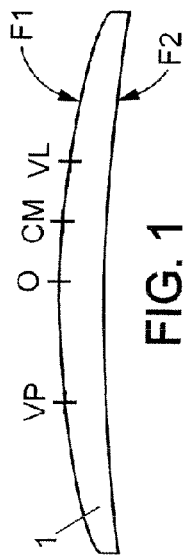
FIG. 1
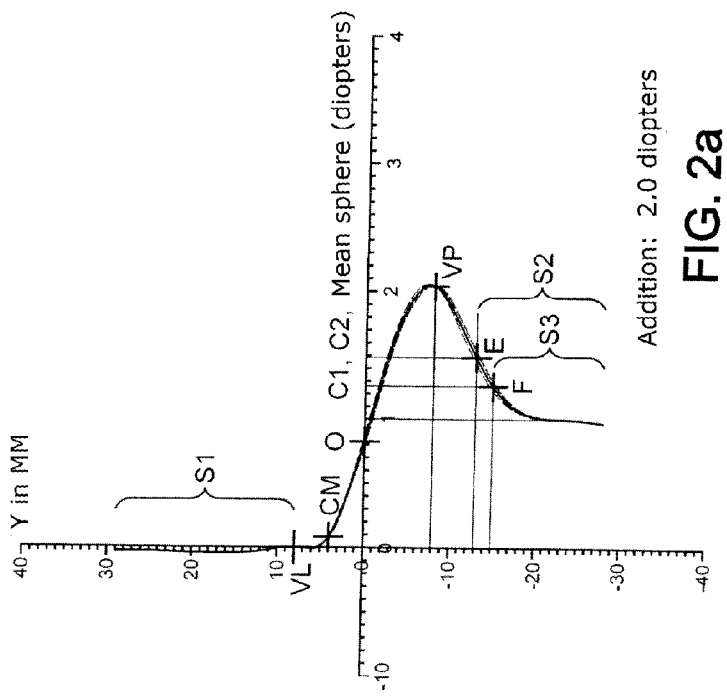

Addition: 2.5 diopters

Addition: 2.5 diopters

PROGRESSIVE LENS FOR OPHTHALMIC SPECTACLES, HAVING AN ADDITIONAL ZONE FOR INTERMEDIATE VISION

CROSS-REFERENCE TO RELATED APPLICATIONS

This application is the National Stage of International Application No. PCT/FR2008/052195, filed on Dec. 3, 2008, which claims the priority of French Application No. 07 08499 filed on Dec. 5, 2007, the contents of which are incorporated herein by reference in their entirety.

The present invention relates to a progressive lens for ophthalmic spectacles, which has an additional zone for intermediate vision.

Progressive lenses of ophthalmic spectacles are in common use, in particular for correcting the presbyopic visual defects of the wearers of these spectacles. In a known manner, a progressive lens has an optical power which varies between different points thereof, so that the correction of the visual defect which is provided by the lens is adapted as a function of the distance of an object which is viewed by the wearer. Thus, in the usual progressive lenses, a far-vision zone is arranged in the upper part of the lens, which is intended for viewing distant objects, i.e. objects situated at 1.5 meters or more from the wearer. At the same time, a near-vision zone is arranged in the lower part of the lens, which is intended for viewing close objects, situated at less than 1.0 meter from the wearer, in particular at approximately forty centimeters from his eyes. The optical power of each progressive lens varies continuously between these far-vision and near-vision zones, so that an intermediate zone situated between them is adapted for viewing objects situated between 1.0 meter and 1.5 meters from the wearer. Thus, when the wearer scans the visual field vertically through a progressive lens, for example from high to low, he uses successively zones of the lens which are intended for viewing shorter and shorter viewing distances, until reaching a distance which is suitable for reading a book in particular. In particular, the intermediate-vision zone allows the wearer to clearly perceive an object situated at a distance comprised between 1.0 and 1.5 meters from his eyes, without moving his head, if this object is situated in a direction at about or slightly inclined below the horizontal.

But if this object is situated lower down in the visual field, the wearer is obliged to lower his head while keeping his eyes slightly inclined in order to have a clear view of the object. This can result in a degree of discomfort and an increased risk of falling.

Therefore, such a progressive lens does not provide the wearer with a clear view of the ground beneath his feet while holding his head in the lowered position in a comfortable and secure manner, as the details of the ground are situated at a distance from his eyes which is of the order of 1.0 to 2.0 meters, although they are viewed through the lower part of the lens, i.e. through the near-vision zone. Of course, visual perception of the ground is particularly important when the wearer encounters stairs, and even more important when walking down stairs. Thus, several studies covering the causes of falls, in particular of the elderly, have shown that a large number of accidents results from conditions of vision and lowering of the head which are unsuitable for encountering the steps of staircases or obstacles present at ground level in front of the wearer's feet. For this reason, the usual progressive lenses which have, in order, a far-vision zone, an intermediate-vision zone and a near zone, do not provide an optimal improvement in viewing steps of a staircase that the wearer is preparing to walk up or down.

In order to respond to this need, several proposals have been made for four-zone progressive lenses. In comparison to the usual progressive lenses mentioned above, they have an additional zone situated below the near-vision zone, and adapted for intermediate-distance vision. In comparison with three-zone progressive lenses, this additional zone for intermediate vision allows the wearer to clearly see an object or an obstacle situated on the ground in front of his feet.

Such a four-zone progressive lens for ophthalmic spectacles comprises at least one complex surface having a variable curvature, a prism reference point and a fitting cross, and is adapted to be placed in front of the wearer's eye so that a scan of the direction of view of the wearer through the lens defines a meridian line which corresponds to the intersection path of the direction of view with this surface. This meridian line links an upper edge and a lower edge of the lens, passing successively through a far-vision point, the fitting cross, the prism reference point and a near-vision point. The fitting cross is situated at 4 mm above the prism reference point and can correspond to the horizontal direction of view when the wearer is standing. The optical power along the meridian line corresponds to a far-vision ophthalmic correction in a first segment of this line which is situated above the far-vision point. It then increases up to a maximum value which is reached at the near-vision point, then decreases from this near-vision point over a determined length in the direction of the lower edge. The lens thus has an optical power addition between the far-vision and near-vision points, as well as the additional zone for intermediate vision close to the lower edge.

Document WO 2004/104674 discloses such a four-zone progressive lens, which allows the wearer to perceive more clearly obstacles present on the ground at an intermediate distance in front of him.

But none of the known progressive lenses which have an additional zone for intermediate vision below the near-vision zone provides the wearer with a clear view of an object situated at a distance comprised between 1.0 to 1.5 meters, in a direction inclined at approximately 35 degrees below the horizontal direction. It appears that these vision conditions are significant when the wearer encounters a new obstacle situated on the ground in front of him, in order to adopt an appropriate posture for approaching and overcoming the obstacle.

A purpose of the present invention thus consists of proposing a progressive lens having an additional zone for intermediate vision, and which fulfils this need.

To this end, the invention proposes a progressive lens having an additional zone for intermediate vision, situated below the near-vision zone, of the type described above, the optical power addition of which is greater than or equal to 2.0 diopters, and for which there is an optical-power increase threshold along the meridian line which is situated approximately at the level of the fitting cross, at a distance from the prism reference point.

In other words, the increase of the optical power of a progressive lens according to the invention, moving along the meridian line from the far-vision point in the direction of the near-vision point, starts high up in the lens. In the jargon used by a person skilled in the art, the channel between the far-vision and near-vision zones is situated quite high up in the lens. In this manner, the near-vision zone can itself be quite high, so that a distance sufficient for the additional zone for intermediate vision remains between the near-vision point and the lower edge of the lens. In particular, the direction of view of the wearer at approximately 35 degrees below the horizontal direction passes through the lens in this additional zone for intermediate vision. Such a lens according to the invention therefore provides the wearer with a clear vision of obstacles situated on the ground in front of him. In this manner, he can spontaneously adopt an appropriate posture in order to overcome the obstacles safely.

In most of the embodiments of the invention, the characteristic according to which the optical-power increase threshold is situated, along the meridian line, at the level of the fitting cross and at a distance from the prism reference point means that a first optical power variation calculated between the far-vision point and the fitting cross is less than 10% of the optical power addition, in absolute value. This first absolute variation is most frequently less than 5% of the optical power addition. At the same time, a second optical power variation calculated between the far-vision point and the prism reference point is greater than 25%, in absolute value, advantageously greater than 30%.

Due to the significant vertical dimension of the additional zone for intermediate vision in a lens according to the invention, it can be cut to the dimensions of an eyeglass seat provided in a frame of a pair of spectacles, without this additional zone for intermediate vision being entirely eliminated during the cutting operation. The invention therefore also relates to a lens as defined previously, after it has been cut according to the dimensions of an eyeglass seat in a frame. In particular, the lens can have a lower edge after cutting which is at a distance of less than 23 mm from the fitting cross, measured approximately along the meridian line. The invention is therefore compatible with the use of a spectacles frame having a reduced vertical dimension, into which the eyeglass is intended to be assembled.

Preferably, the near-vision point of the lens, where the optical power reaches the maximum value along the meridian line, can be situated at less than 15 mm below the fitting cross. In particular, the near-vision point can be situated between 10 mm and 12 mm below the fitting cross.

According to a first improvement of the invention, the optical power along the meridian line has variations which are less than 0.5 diopter in a second segment of this meridian line, within the additional zone for intermediate vision. This second segment is situated below the near-vision point, between a point situated at a distance less than or equal to 18 mm from the fitting cross and the lower edge of the lens. In other words, the additional zone for intermediate vision is not a transition channel in which the optical power decreases regularly in the direction of the lower edge. Rather, it is a vision zone through which the direction of view can vary vertically while viewing objects which are situated at intermediate distances that are almost identical, although at different heights. The result is a good visual comfort through this additional zone. In particular, no visual fatigue is experienced, nor is there a need to raise or lower the head vertically in order to adapt the height of the eyeglass in relation to the distance of view and the height of an object viewed through this additional zone.

Preferably, the optical power along the meridian line can moreover have variations which are less than 0.25 diopter in a third segment of the meridian line situated within the second segment. This third segment can in particular extend between a point situated at a distance less than or equal to 22 mm from the fitting cross and the lower edge of the lens. The comfort of use of the lens is then even greater.

Advantageously, the second segment and/or the third segment can have a length greater than 5 mm, or even greater than 10 mm, along the meridian line.

According to a second improvement of the invention the lens can have, in lateral portions thereof situated on each side of the near-vision point, an optical power less than the value reached at the near-vision point. Moreover, the optical power can be less than half of the value at the near-vision point at two points of the lens which are horizontally separated by 8 mm in relation to and on each side of the near-vision point. Thus, the far-vision zone can be laterally unrestricted, at least with regard to the optical power values, and thus offer the wearer a broad far-vision sector, extending further downwards on each side.

A lens according to the invention can be adapted, in particular, in order at least partially to correct a wearer's presbyopia in a zone thereof surrounding the near-vision point.

Other features and advantages of the present invention will become apparent in the following description of a non-limitative embodiment, with reference to the attached drawings, in which:

FIG. 1 is a general profile view of a lens according to the invention;

FIGS. 2a and 2b are diagrams showing variations in the tangential and sagittal curvatures, respectively for a first lens according to the invention which has a addition of 2.0 diopters, and a second lens according to the invention which has an addition of 2.5 diopters;

FIGS. 3a and 3b are maps of the mean sphere and cylinder, respectively, for the first lens in FIG. 2a.

Figure 3B:
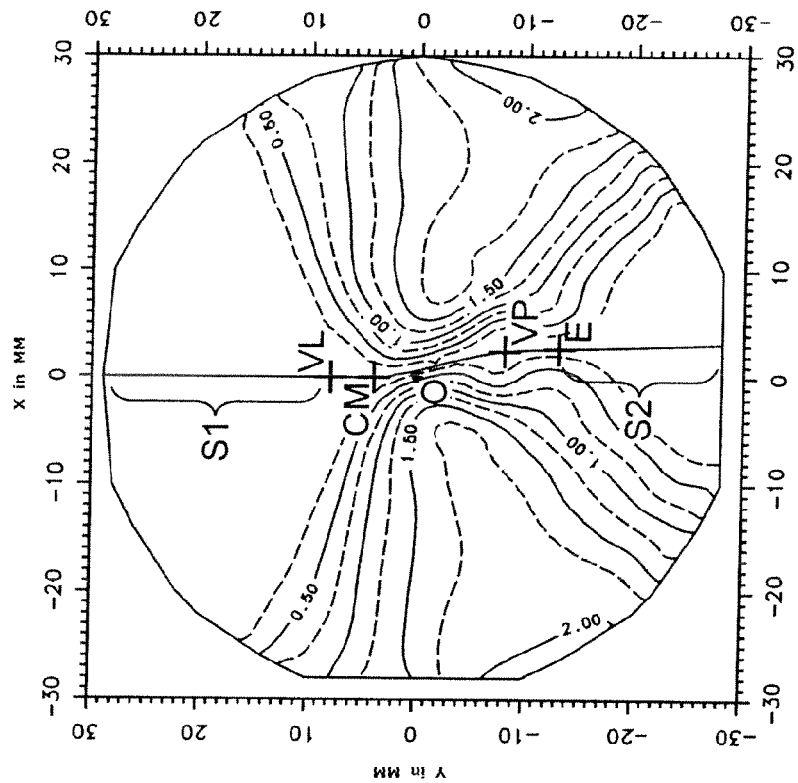

In a known manner and according to FIG. 1, a lens 1 for ophthalmic spectacles comprises a front face, labelled F1 in the figure, and a rear face, labelled F2 and opposite face F1. Between these two faces, a refringent transparent medium is constituted which is usually homogenous. The lens can be a finished spectacles eyeglass, the two faces F1 and F2 of which have definitive shapes. This, then, can be an eyeglass which is already cut to the dimensions of an eyeglass seat of a frame of a pair of spectacles. But the finished eyeglass can also be considered before cutting. Alternatively, the lens can be a semi-finished eyeglass, a single face of which has a definitive shape, and the other face is intended to be machined subsequently according to a wearer's prescription. In this case, the optical power of the lens is understood as the optical power of a finished eyeglass obtained from the semi-finished eyeglass. Most frequently, the front face of the semi-finished eyeglass is definitive, and the rear face is that intended to be machined in a subsequent operation. In the present patent application, by ophthalmic lens is meant equally, a finished or semi-finished eyeglass. When uncut, the lens has a peripheral edge which is most frequently circular, for example having a diameter of 60 mm (millimeter).

In the following, the terms "on", "under", "above", "below" and "lateral" are used to qualify portions or points of the lens in relation to a reference position of the lens used by the wearer. This position, called position of use of the lens by the wearer, corresponds to the wearer holding the head vertical, wearing the frame in which the lens is assembled. Moreover, the faces F1 and F2 of the lens, respectively front and rear, are thus denoted in relation to their position when the eyeglass is used in this way by the wearer.

In a preferred embodiment of the invention which corresponds to the examples described hereinafter, the complex surface of the progressive lens is situated on the rear face F2. In other words, the face F2 has a mean sphere and cylinder which vary continuously along this face. It is noted that the mean sphere (Sph) and the cylinder (Cyl) of a complex surface, estimated at a point thereof, are given respectively by the following formulae:

$$Sph = \frac{n-1}{2} \cdot \left(\frac{1}{R1} + \frac{1}{R2}\right) \quad (1a)$$

$$Cyl = (n-1) \cdot \left|\frac{1}{R1} - \frac{1}{R2}\right| \quad (1b)$$

in which n is the light refractive index of the material of the lens at the point considered, and R1 and R2 denote respectively the maximum and minimum radii of curvature of the complex surface at the same point, measured in two perpendicular directions. The numerical values shown in FIGS. 2a, 2b, 3a, 3b, 4a and 4b correspond to lenses which are constituted by the same transparent homogenous material, the refractive index n of which is equal to 1.591.

The front face F1 of the lens 1 can be a standard production surface, obtained during the moulding of the lens. In particular, it can be spherical.

The rear face F2 can be machined in such a manner as to confer on the lens the characteristics of the invention, by using one of the precision machining methods known to a person skilled in the art, in particular a numerical control machining method.

During machining of the rear face F2, the addition of constant mean sphere and cylinder components to the local values shown by the maps in FIGS. 3a, 3b, 4a and 4b makes it possible to obtain a lens corresponding to an ophthalmic prescription issued for the wearer. The rear face F2 can thus be adapted moreover so that the lens, at the far-vision point, has optical power and astigmatism values corresponding to a prescription issued for the wearer.

The following points are defined on the front face F1 of the lens 1, in a manner known to a person skilled in the art:
   the prism reference point, called O, with which a prism value of the lens is associated;
   a fitting cross, called CM, which serves to adjust a position of the eyeglass vertically with respect to the centre of the wearer's pupil;
   a far-vision reference point, called VL, with which an optical power value is associated adapted in order to correct the wearer's vision when he views a distant object, typically situated at more than two meters from him; and
   a near-vision reference point, called VP, with which an optical power value is associated adapted in order to correct the wearer's vision when he views a close object, typically situated approximately forty centimeters from his eyes.

Usually, the fitting cross CM corresponds to the horizontal direction of view when the wearer is standing. When the eyeglass has not yet been cut to the dimensions of a seat in a spectacles frame, the prism reference point O corresponds in general to the geometrical centre of the eyeglass.

The points O, CM, VL and VP are initially defined on the front face F1 of the lens 1. Reference points corresponding to these are defined on the rear face F2. These points of the face F2 can be situated respectively opposite the points O, CM, VL and VP, or be offset in relation thereto, following the path of the light rays passing through the points O, CM, VL and VP of the face F1. Alternatively, the reference points of the face F2 can be defined from the points O, CM, VL and VP of the face F1 by using various approximations of light paths.

The rear face F2 of the lens 1 is then referenced by two Cartesian axes expressed in millimeters: X for the horizontal axis and Y for the vertical axis, the latter being oriented positively upward. Usually, the point O is the centre of this frame of reference, and the coordinates of the point CM are X=O and Y=4 mm. The coordinates of the far-vision point VL are X=O and Y=8 mm. VL is therefore situated on a vertical line above O. The near-vision point VP is situated below O, while being laterally offset (parallel to the X axis) in relation to VL. The direction of offset of VP is reversed between a right lens and a left lens. A line LM, called principal meridian line, links the points VL, CM, O and VP. It corresponds to the route over the lens of the direction of the view when the wearer successively views objects situated in front of him at variable heights and distances.

The diagrams in FIGS. 2a and 2b show the variations of the tangential and sagittal curvatures along the meridian line LM, of the rear faces of two different lenses according to the invention, respectively having addition values set by their rear faces and which are equal to 2.0 and 2.5 diopters. The tangential and sagittal curvatures which are respectively called C1 and C2, are equal to the reciprocals of the radii of curvature R1 and R2 in the formulae 1a and 1b noted above.

In a known manner, the optical power called "OP" of a lens, for a direction of view through the latter, results from the combination of the diopter effects of the faces F1 and F2. More precisely, the optical power for a given direction of view results from the mean sphere and cylinder of each of the faces F1 and F2 at the points at which a light ray corresponding to the direction of view passes through these faces.

The addition of the lens 1 is then defined as the difference between the optical power values OP at the points VP and VL:

$$A = OP(VP) - OP(VL) \quad (2)$$

Figure 3A:
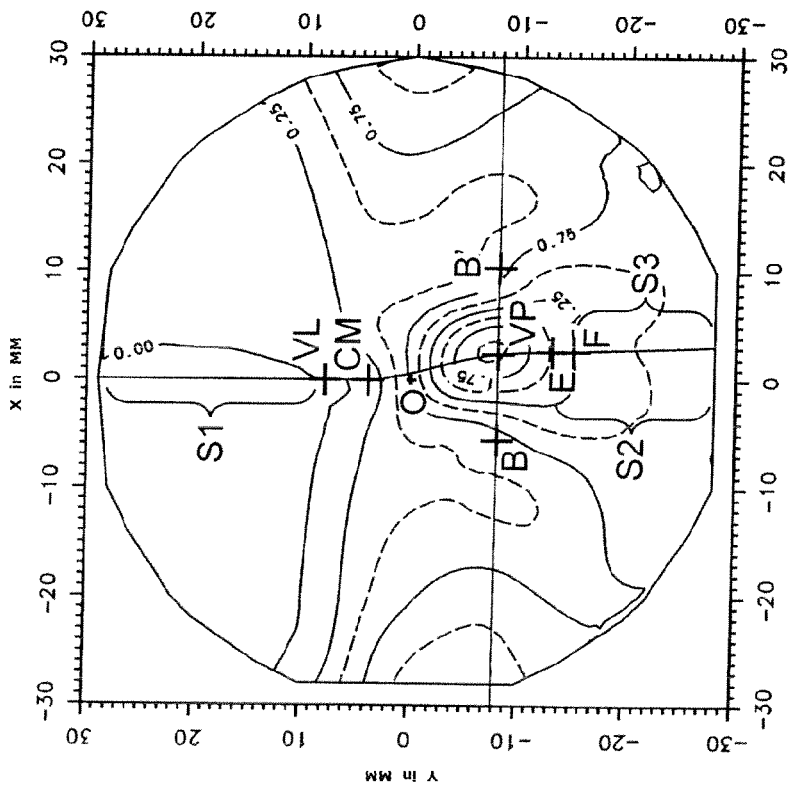
Figure 4B:
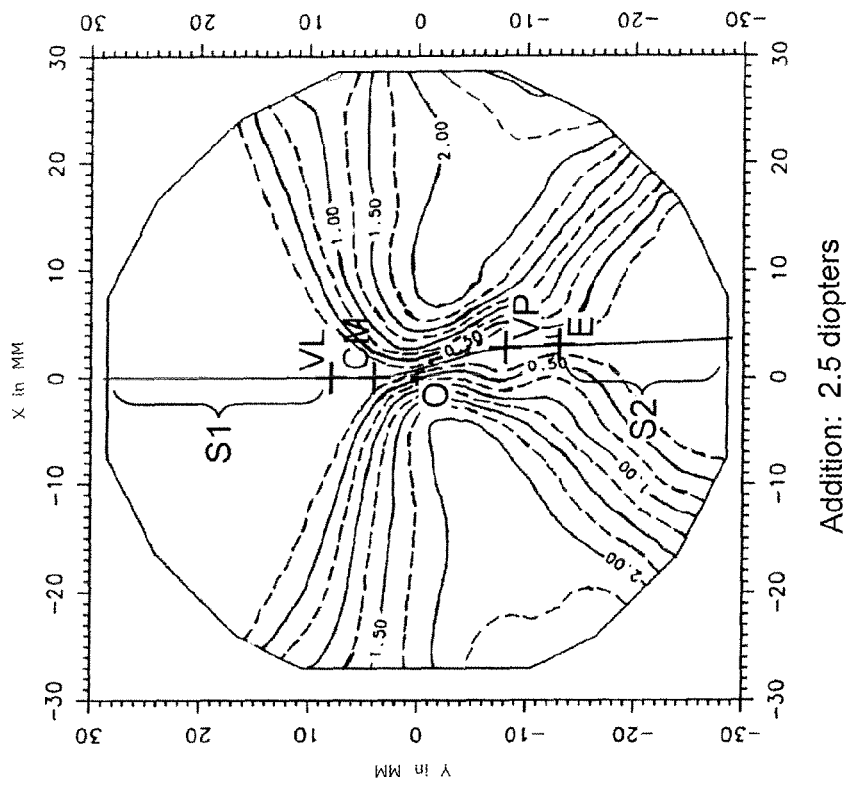
FIGS. 4a, 4b correspond respectively to FIGS. 3a and 3b for the second lens in FIG. 2b.
Figure 4A:
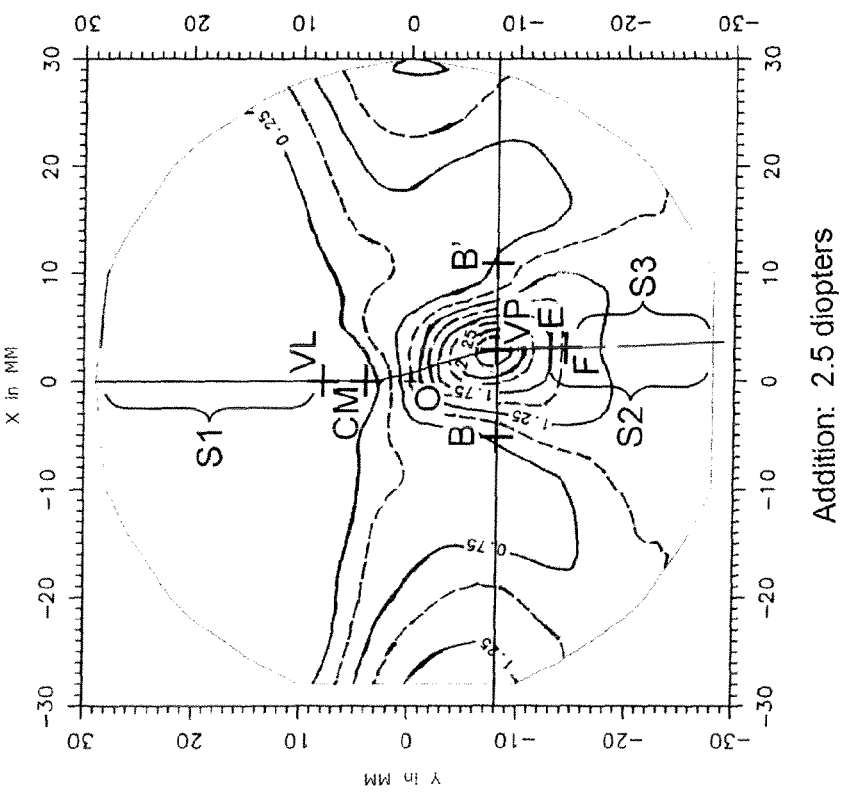

FIGS. 3a and 4a are mean sphere maps of the rear faces of the two lenses in FIGS. 2a and 2b, respectively. Each of these maps is limited by the peripheral edge of the corresponding lens, and shows the mean sphere value for each point of the rear face of the lens. The lines reproduced on these maps are isosphere lines, linking points of the rear face of each lens which correspond to the same mean sphere value. This value is given in diopters for certain of these lines.

Similarly, FIGS. 3b and 4b are cylinder maps. The lines reproduced thereon are isocylinder lines, linking points of the rear face of each lens which correspond to the same cylinder value.

The mean sphere value is maximum at the point VP. In the two lenses in FIGS. 2a, 3a and 3b on the one hand, and 2b, 4a and 4b on the other hand, the near-vision point VP has the vertical coordinate Y=−8 mm. This value corresponds to a position significantly higher than the value of −14 mm which is usually adopted for the vertical coordinate of the near-vision point VP. The vertical distance between the near-vision point VP and the fitting cross CM is then 12 mm, for both lenses.

For these lenses, the mean sphere is approximately zero, in particular less than 0.25 diopter in the zone of the eyeglass situated above the far-vision point VL. In particular, it is less than 0.25 diopter in the whole segment of the meridian line LM extending between the point VL and the upper edge of the lenses. This segment is called first segment of the line LM and marked S1 in the figures.

The diagrams 2a and 2b, as well as the maps 3a and 4a show that the mean sphere increases between the points VL and VP, in the direction of VP, with an increase threshold situated approximately at the fitting cross CM. In other words, the mean sphere remains less than 0.25 diopters on the meridian line LM between the point VL and the fitting cross CM, and becomes greater than 0.25 diopter close to CM. At the level of the prism reference point O, the mean sphere value is close to (A−0.5 diopter)/2, varying by less than 0.2 diopter. This relationship between the mean sphere value at the point O and the addition A of the lens was observed by the inventors for all the lenses produced according to the invention. They then provide a good visual comfort.

Below the near-vision point VP, the mean sphere value decreases in the direction of the lower edge of the lens, and reaches a limit value which is close to half of the addition A, varying by less than 0.5 diopter, even by less than 0.25 diopter. This value corresponds to an intermediate vision distance comprised between 1.0 and 1.5 meter. This decrease is concentrated below, and starting from, the point VP, so that the optical power can be substantially constant over a segment of the meridian line LM above the lower edge of the lens. In particular, a residual decrease of the mean sphere up to the lower edge is 0.50 diopter in a second segment S2 of the line LM linking a point E thereof with the lower edge. For the first lens (FIGS. 2a, 3a, 3b), having an addition of 2.0 diopters, as well as for the second lens (FIGS. 2b, 4a, 4b), having an addition of 2.5 diopters, the point E has a vertical coordinate of −13 mm. It is therefore situated at 17 mm below the fitting cross CM. Similarly, the residual decrease of the mean sphere up to the lower edge is 0.25 diopter in a third segment S3 of the line LM, between a point F of the segment S2 and the lower edge. For the two lenses under consideration, the point F has a vertical coordinate of −15 mm, approximately, i.e. it is situated at 19 mm below the fitting cross CM.

On each side of the near-vision point VP, on a horizontal straight line passant through the point VP, the mean sphere is less than its value at the point VP. Moreover, at points B and B' of this straight line which are at a distance of 8 mm from the point VP, the mean sphere is less than half of its value at the point VP. In this manner, the mean sphere decreases rapidly in the lateral portions of the lens on each side of the point VP. The rear face of the lens then has two wide lateral extensions of the far-vision zone, in the direction of the bottom of the lens, in which the mean sphere varies from a quantity which is less than a quarter of the addition A, in comparison with the mean sphere value at the far-vision point VL.

FIGS. 3b and 4b show that the cylinder has values of zero, or less than 0.25 diopter, in a first wide zone situated on each side of the first segment S1, corresponding to the far-vision zone of the lenses, as well as in a second zone situated on each side of the second segment S2, corresponding to the additional zone for intermediate vision. These two zones are therefore devoid of involuntary astigmatism.

Although the invention has been described in detail for lenses the rear faces of which have complex shapes and the front faces of which have spherical or toric shapes, it is understood that the invention can be realized in a similar manner for a lens having a complex front face and a spherical or toric rear face. Similarly, both faces can be complex. The variations of the optical power according to the invention thus result from the combination of the mean sphere and cylinder variation of the two faces.

Similarly, although the maps provided in the figures correspond to only two addition values given as examples, it is understood that the invention can be realized in the same manner for any addition values whatever, greater than or equal to 2.0 diopters. In particular, it can be realized for addition values up to 4.0 diopters.

The invention claimed is:

1. Progressive lens for ophthalmic spectacles comprising at least one complex surface having a variable curvature, a prism reference point (O) and a fitting cross (CM), and adapted in order to be placed in front of a wearer's eye so that a scan of a direction of view of the wearer through the lens defines a meridian line (LM) corresponding to a intersection path of said direction of view with said surface, said meridian line linking an upper edge and a lower edge of the lens, passing successively through a far-vision point (VL), the fitting cross, the prism reference point and a near-vision point (VP), the fitting cross (CM) being situated at 4 mm above the prism reference point (O) and capable of corresponding to a horizontal direction of view when the wearer is standing, an optical power of said lens along the meridian line (LM) corresponding to a far-vision ophthalmic correction in a first segment (S1) of said meridian line situated above the far-vision point (VL), increasing until reaching a maximum value at the near-vision point (VP) and decreasing starting from said near-vision point over a determined length in the direction of the lower edge, so that the lens has an optical power addition between far-vision (VL) and near-vision (VP) points, and has moreover an additional zone for intermediate vision close to the lower edge, the optical power addition being greater than or equal to 2.0 diopters, the lens being characterized in that, there is an optical-power increase threshold along the meridian line (LM) which is situated approximately at the level of the fitting cross (CM), at a distance from the prism reference point (O), with a first optical power variation between the far-vision point and said fitting cross which is less than 10% of the optical power addition, in absolute value, and a second optical power variation between the far-vision point and said prism reference point which is greater than 25%, in absolute value.

2. Lens according to claim 1, in which the first optical power variation, between the far-vision point (VL) and the fitting cross (CM), is less than 5% of the optical power addition, in absolute value.

3. Lens according to claim 1, in which the second optical power variation, between the far-vision point (VL) and the prism reference point (O), is greater than 30% of the optical power addition, in absolute value.

4. Lens according to claim 1, in which the near-vision point (VP) where the optical power reaches the maximum value along the meridian line (LM), is situated at less than 15 mm below the fitting cross (CM).

5. Lens according to claim 4, in which the near-vision point (VP) where the optical power reaches the maximum value along the meridian line (LM), is situated between 10 mm and 12 mm below the fitting cross (CM).

6. Lens according to claim 1, in which the optical power along the meridian line (LM) has variations less than 0.5 diopter in a second segment (S2) of said meridian line situated below the near-vision point (VP), within the additional zone for intermediate vision, between a point (E) which is situated at a distance less than or equal to 18 mm from the fitting cross (CM) and the lower edge of the lens.

7. Lens according to claim 6, in which said second segment (S2) has a length greater than 5 mm along the meridian line (LM).

8. Lens according to claim 6, in which the optical power along the meridian line (LM) has variations less than 0.25 diopter in a third segment (S3) of said meridian line situated within said second segment (S2), between a point (F) which is situated at a distance less than or equal to 22 mm from the fitting cross (CM) and the lower edge of the lens.

9. Lens according to claim 8, in which said third segment (S3) has a length greater than 5 mm along the meridian line (LM).

10. Lens according to claim 9, in which said third segment (S3) has a length greater than 10 mm along the meridian line (LM).

11. Lens according to claim 1, having, in lateral portions of the lens situated on each side of the near-vision point (VP), an optical power less than the value of said optical power which is reached at said near-vision point, and less than half of said value reached at the near-vision point at two points (B, B') of the lens which are at a distance of 8 mm horizontally in relation to and on each side of said near-vision point.

12. Lens according to claim 1, adapted in order to correct at least partially, a presbyopia of the wearer in a zone of the lens surrounding the near-vision point (VP).

13. Lens according to claim 1, in which the complex surface is situated on a rear face (F2) of said lens, with respect to a position of use of the lens by the wearer.

14. Lens according to claim 13, in which a front face (F1) of said lens, opposite the rear face, is spherical.

15. Lens according to claim 14, in which the rear face (F2) is adapted moreover so that the lens has an optical power and astigmatism values at the far-vision point (VL) which correspondent to a prescription issued for said wearer.

16. Lens according to claim 1, cut according to the dimensions of an eyeglass seat provided in a frame of a pair of spectacles.

17. Lens according to claim 16, having after cutting, a lower edge situated at a distance less than 23 mm from the fitting cross (CM), measured approximately along the meridian line (LM).

* * * * *